US008396461B2

(12) United States Patent
Soderstrom et al.

(10) Patent No.: US 8,396,461 B2
(45) Date of Patent: Mar. 12, 2013

(54) USER INITIATED INVITE FOR AUTOMATIC CONFERENCE PARTICIPATION BY INVITEE

(75) Inventors: Gustav Soderstrom, Bromma (SE); Nathanael Joe Hayashi, Piedmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 16 days.

(21) Appl. No.: 13/297,153

(22) Filed: Nov. 15, 2011

(65) Prior Publication Data

US 2012/0066326 A1 Mar. 15, 2012

Related U.S. Application Data

(63) Continuation of application No. 11/944,248, filed on Nov. 21, 2007, now Pat. No. 8,081,958.

(60) Provisional application No. 60/868,321, filed on Dec. 1, 2006.

(51) Int. Cl.
*H04M 3/42* (2006.01)

(52) U.S. Cl. .................. 455/416; 415/414.1; 415/141.3; 370/260; 370/312; 379/202.01

(58) Field of Classification Search .............. 455/414.1, 455/413, 516–519, 445, 463, 435.1, 458, 455/559.1–556.2, 432.1, 433, 435; 370/230, 370/430.1, 331, 260, 312; 379/202.01–207.01
See application file for complete search history.

(56) References Cited

U.S. PATENT DOCUMENTS

| 5,493,692 | A | 2/1996 | Theimer et al. |
| 6,442,593 | B1 | 8/2002 | Wang et al. |
| 6,690,918 | B2 | 2/2004 | Evans et al. |
| 6,834,195 | B2 | 12/2004 | Brandenberg et al. |
| 6,937,597 | B1 | 8/2005 | Rosenberg et al. |
| 6,947,451 | B1 | 9/2005 | Dommety et al. |
| 6,983,370 | B2 * | 1/2006 | Eaton et al. ................... 713/182 |
| 7,257,402 | B2 | 8/2007 | Khalil et al. |

(Continued)

FOREIGN PATENT DOCUMENTS

| KR | 20040020098 | 9/2005 |
| KR | 20060014738 | 2/2006 |

(Continued)

OTHER PUBLICATIONS

International Preliminary Report on Patentability for International Patent Application No. PCT/US2007/085524 mailed Jun. 11, 2009.

(Continued)

*Primary Examiner* — Kamran Afshar
*Assistant Examiner* — Marisol Fahnert
(74) *Attorney, Agent, or Firm* — Frommer Lawrence & Haug LLP; Jamie L. Wiegand

(57) ABSTRACT

A mobile device, system, and method are directed towards enabling a user, virtually on the fly, to invite another user to participate in an on-line conferencing session, by providing a link that automatically enables the other user to participate in the conferencing session. In one embodiment, the conferencing session is a text messaging conference session, such as one that might employ instant messaging, or the like. In one embodiment, a user may request a conferencing session to be established, by sending a request to a server device. The request may, include an identifier of an invitee with whom the first user wishes to communicate. The server determines a unique link for the invitee and session, and sends the invitee an invite message with their unique link. Selecting the unique link enables the invitee to automatically access and to participate in the conferencing session with the first user.

20 Claims, 15 Drawing Sheets

U.S. PATENT DOCUMENTS

| | | | |
|---|---|---|---|
| 7,308,476 B2 | 12/2007 | Mannaru et al. | |
| 7,567,662 B1 | 7/2009 | Renner et al. | |
| 7,720,464 B2 * | 5/2010 | Batta | 455/411 |
| 2001/0011366 A1 | 8/2001 | Beck et al. | |
| 2001/0054087 A1 | 12/2001 | Flom et al. | |
| 2002/0073113 A1 * | 6/2002 | Caraher et al. | 707/500 |
| 2002/0143871 A1 | 10/2002 | Meyer et al. | |
| 2003/0093311 A1 | 5/2003 | Knowlson | |
| 2003/0163815 A1 | 8/2003 | Begeja et al. | |
| 2003/0191689 A1 | 10/2003 | Bosarge et al. | |
| 2004/0077796 A1 | 4/2004 | Daniel et al. | |
| 2004/0120298 A1 | 6/2004 | Evans et al. | |
| 2004/0128347 A1 | 7/2004 | Mason et al. | |
| 2004/0202303 A1 * | 10/2004 | Costa-Requena et al. | 379/205.01 |
| 2004/0203677 A1 * | 10/2004 | Brown et al. | 455/416 |
| 2004/0203863 A1 | 10/2004 | Huomo | |
| 2004/0249700 A1 | 12/2004 | Gross | |
| 2004/0249713 A1 | 12/2004 | Gross | |
| 2004/0260600 A1 | 12/2004 | Gross | |
| 2004/0267604 A1 | 12/2004 | Gross | |
| 2005/0071440 A1 | 3/2005 | Jones et al. | |
| 2005/0135279 A1 | 6/2005 | Zabawskyj | |
| 2006/0020596 A1 | 1/2006 | Liu et al. | |
| 2007/0132550 A1 * | 6/2007 | Avraham et al. | 340/5.21 |

FOREIGN PATENT DOCUMENTS

| | | |
|---|---|---|
| KR | 1020060012191 | 2/2006 |
| WO | 0178319 | 10/2001 |
| WO | 2004077796 A2 | 9/2004 |

OTHER PUBLICATIONS

International Search Report and Written Opinion for International Patent Application No. PCT/US2007/085524 mailed Jun. 4, 2008.

International Search Report and Written Opinion for International Patent Application No. PCT/US2007/068796 mailed Oct. 19, 2007.

Official Communication for Korean Patent Application No. 10-2009-7013753 mailed Feb. 14, 2011.

Official Communication for U.S. Appl. No. 11/944,248 mailed Mar. 3, 2011.

Official Communication for U.S. Appl. No. 11/944,248 mailed Sep. 15, 2011.

\* cited by examiner

USER INITIATED INVITE FOR AUTOMATIC CONFERENCE PARTICIPATION BY INVITEE

CROSS-REFERENCE

This continuation patent application claims priority to U.S. patent application Ser. No. 11/944,248, entitled "User Initiated Invite For Automatic Conference Participation By Invitee" filed on Nov. 21, 2007, which claims priority to U.S. Provisional Patent Application No. 60/868,321, entitled "User Initiated Invitation That Includes A Link To Automatically Participate In A Conversation Or Service," filed on Dec. 1, 2006, the benefit of which is claimed under 35 U.S.C. §119, and further wherein each are incorporated herein by reference.

TECHNICAL FIELD

The present invention relates generally to mobile communications and, more particularly, but not exclusively to enabling a user, virtually on the fly, to invite another user to participate in an on-line session and/or service, by providing a link that automatically enables the other user to participate in the session and/or service.

BACKGROUND

Tremendous changes have been occurring in the Internet that influence our everyday lives. For example, mobile computing devices have created new meeting grounds. They have been called the new power lunch tables and new golf courses for business life in the U.S. Moreover, many people are using such mobile computing devices to reconnect themselves to their friends, their neighborhood, their community, and the world.

The development of such mobile computing devices and other computing technologies touch countless aspects of our everyday lives, providing instant access to people of similar mindsets, and enabling us to form partnerships with more people in more ways than ever before. However, as mobile computing transforms our lives, many people may find the technology complicated and "non-user friendly." For example, using some of today's computing technologies may require a user to perform a plurality of complicated actions to communicate with others. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
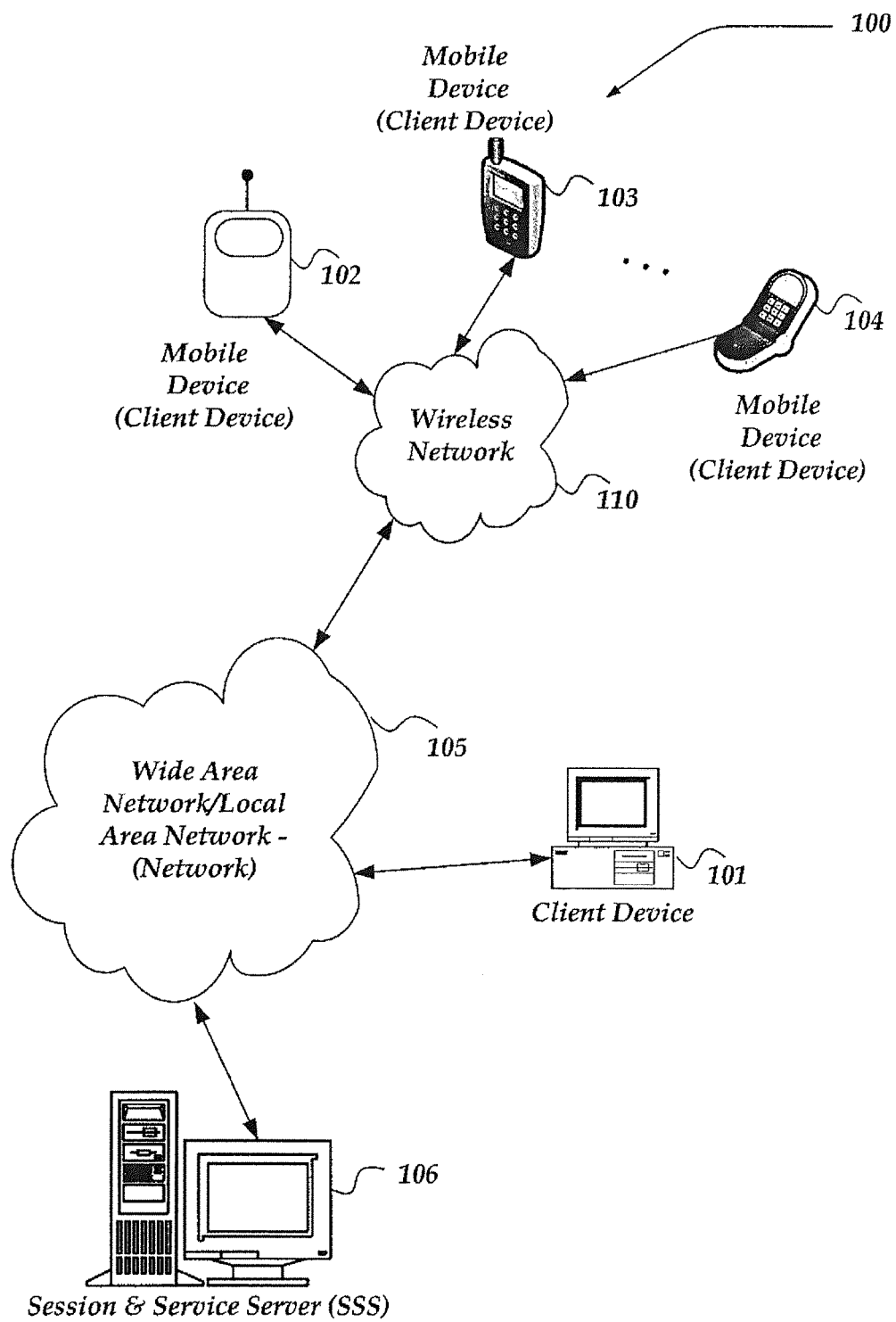
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" an item, such as a request, invite message, response, or other message, form a device, or component, includes receiving the message indirectly, such as when forwarded by one or more other devices or components. Similarly, "sending" an item to a device or component includes sending the item indirectly, such as when forwarded by one or more other devices or components.

As used herein, the terms "text messaging," or "text message" refer to SMS messaging, as well as a variety of other limited size message protocols, including, but not limited to, Instant Messaging (IM), Multimedia Messaging Service (MMS) message, or an Enhanced Message Service (EMS) message protocols.

Briefly stated the present invention is directed towards enabling a user, virtually on the fly, to invite another user to participate in a session, by providing a link that automatically enables the other user to participate in the session. In one embodiment, the session is a text messaging conference session, such as an instant messaging session, or the like. However, the invention is not so limited, and other types of sessions may be included. For example, an invite might be to a MMS session, an EMS session, an internet relay chat (IRC)

session, or the like. Thus, the invite may be provided through one or more different communication channels and/or protocols.

The invite may also be to a service, such as a video service, a photo service, or the like, or even be an invite to access content. Thus, the terms "conferencing session" or "session" refer to any networking communication between two or more users that enables the two or more users to carry on an interactive conversation. A "conferencing session" or "session" also refers to any networking communication that enables a first user to invite another user to a network accessible service, or to access network accessible content, such as photographs, videos, audio files, text files, or the like.

In one embodiment, an interactive conversation may generate a history log of the communication between the two or more users. In one embodiment the history log may be organized as a thread conversation between the two or more users.

In one embodiment, a first user of a client device may request a conferencing session to be established, by sending a request to a server device. The first user may, in one embodiment, include within the request an identifier of one or more other users with which the first user wishes to communicate. In one embodiment, the first user may provide the identifier(s) subsequent to sending the request. In one embodiment, the first user may also include a message to the one or more other users inviting them to join the conferencing session. The server determines a unique link for each of the one or more other users (invitees), includes the unique link into messages. Each of the one or more other users may then receive the message with their unique link. Selecting the unique link enables the invitee to automatically access and participate in the conferencing session with the first user. Subsequently, the invitee(s) may invite others to also join the conferencing session by sending a request to the server with new invitee's identifier. In one embodiment, as a user joins the conferencing session, the user may be enabled to access a history log of the communication between users that may have previously joined the conferencing session. Employing the present invention to invite existing and/or new users to a session, service, and/or to access content, is directed towards providing strong viral growth of such offerings, not only because the invitation can be sent over more than one channel, but it is configured to provide a simple automatic mechanism for use from at least an end-user's perspective.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Session & Service Server (SSS) 106, mobile devices (client devices) 102-104, and client device 101.

One embodiment of mobile devices 102-104 (also called client devices, generally) is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, a Mobile Subscriber Integrated Services Digital Network (MS-ISDN), Mobile Identification Number (MIN), an electronic serial number (ESN), or other mobile device identifier. The information may also indicate a content format that the mobile device is enabled to employ, as well as other configuration aspects and/or capabilities of mobile devices 102-104.

Mobile devices 102-104 may also be configured to communicate a message, such as through Short Message Service (SMS), Multimedia Message Service (MMS), instant messaging (IM), EMS, internet relay chat (IRC), Jabber, and the like, between another computing device, such as SSS 106, client device 101, or the like. However, the present invention is not limited to these message protocols, and virtually any other message protocol may be employed.

Mobile devices 102-104 may be further configured to enable a user to participate in conferencing sessions, such as IM sessions, or the like. However, the user may also be able to participate in any of a variety of other types of conferencing sessions. Mobile devices 102-104 may also enable a user to invite another user into the conferencing session, as well as to send an invite to the other user to access various content, or services. In one embodiment, the invite might be received by one of mobile devices 102-104 (or client device 101) as a text message. In one embodiment, the text message may include a link or other mechanism that enables a user to join the conferencing session, access the content, or access the service. In one embodiment, mobile devices 102-104 may enable a user to view threaded conversation logs associated with the conferencing session, or the like. Moreover, mobile devices 102-104 may enable a user to interact with the browser application, email application, IM applications, SMS application, and the like. As such, mobile devices 102-104 may include one or more client applications that are configured to manage various actions on behalf of the client device.

Mobile devices 102-104 may further be configured to include a client application that enables the end-user to log into an end-user account that may be managed by another computing device. Such end-user account, for example, may be configured to enable the end-user to receive emails, send/receive IM messages, SMS messages, access selected web pages, participate in a session, such as a messaging session, access a service or content, or the like. However, such participation may also be performed without logging into the end-user account.

Mobile devices 102-104 may also communicate with non-mobile client devices, such as client device 101, or the like. In one embodiment, such communications may include participation in conferencing sessions, sharing of photographs, sending/receiving of text messages, providing and/or receiving invites to conferencing sessions, services, or other activities.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple SSS 106 and its components with other computing devices, including client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between SSS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of SSS 106 is described in more detail below in conjunction with FIG. 3. Briefly, however, SSS 106 may include any computing device capable of connecting to network 105 to enable a user, virtually on the fly, to invite another user to a conferencing session, and/or to a service, or to access some content such as a picture, video, audio files, text files, or the like. Examples of such services include but are not limited to photo sharing services, video sharing services, audio sharing services, blog services, calendar sharing services, or the like. The term "virtually on the fly," as used herein, refers to a mechanism that enables the user to perform actions that result in an almost immediate action, rather than performing a sequence of requests, such as a reservation for the action to occur some time in the future. Thus, for example, the user may make the request for establishing a session, and inviting others. The session would then be established almost immediately, as opposed to scheduling the session in the future, and waiting until the scheduled time to initiate the session.

A user may send a request to SSS 106 to invite one or more other users to the conferencing session, service, or to access content. SSS 106 may then determine unique identifiers for each of the one or more other users. The unique identifiers may be unique to each user as well as being unique to each conferencing session, service, content access, or other invite. In one embodiment, the unique identifier may also uniquely identifier the inviting user. Being unique to each user is directed to inhibiting sharing or improper usage of the unique identifier by another user. It also enables SSS 106 to recognize different users, newly joining users to a conferencing session, as well as re-joining users to the conferencing session, service, or the like.

In one embodiment, the unique identifier may be a hash, combination, or the like, of a device identifier for the invitee user and a session identifier. In another embodiment, the unique identifier may be configured to be employed as an index, or the like, that maps to a device identifier, session identifier combination. However, the unique identifier is not constrained to these examples, and other mappings, relationships, or the like may also be used.

In one embodiment, the unique identifier may be configured to be useable for a session, or the like. For example, in one embodiment, the unique identifier may enable the respective user to join a conference session once, but not rejoin the conferencing session if the user leaves. However, in another embodiment, the unique identifier may be configured to remain valid as long as the conferencing session is active, allowing the respective user to leave the session, and rejoin it at a later time. In yet another embodiment, the unique identifier may remain valid for an extended time after the related conferencing session is terminated, or similar invite is revoked or terminated. In this manner, the respective user may be enabled to access history information that may be available for the conferencing session, or the like.

In any event, SSS 106 may then send an invite message to the one or more invitee users. SSS 106 may send the invite message using any of a variety of messaging protocols, including, but not limited to SMS, IM, RSS, IRC Chat, email, or the like. The invite message may include a link to enable the invitee user to join the conferencing session, service, or access the content. The link may, in one embodiment, be configured based on the unique identifier. In one embodiment, the link may be configured as a WAP URL within the invite message.

When the invitee user clicks on the link, a message may be sent to SSS 106 that automatically (i.e., without further action on the part of the invitee user) enables the invitee user to join the conferencing session, service, or to access the content. In one embodiment, SSS 106 may also enable the invitee user to view a history log of threaded conversations of users within the conferencing session. Moreover, SSS 106 may provide to the user's client device, a script, application, applet, or the like, or other mechanism that enables the invitee user to subsequently invite yet another user to the conferencing session, service, or to access the content.

SSS 106 may also, in one embodiment, be configured to manage the conferencing session, service, and/or content associated with the invite. Thus, in one embodiment, SSS 106 may include a messaging server useable for conferencing sessions, to manage sending and receiving invites, or the like. Moreover, SSS 106 may also include a web server, file server, content server, or the like, for managing a variety of other services and/or content. SSS 106 also may employ, in one embodiment, a process such as is described below in conjunction with FIG. 4, to perform at least some of its actions.

Devices that may operate as SSS 106 include personal computers desktop computers, multiprocessor systems, microprocessor-based or programmable consumer electronics, network PCs, servers, and the like.

Although FIG. 1 illustrates SSS 106 as a single computing device, the invention is not so limited. For example, one or more functions of SSS 106 may be distributed across one or more distinct computing devices. For example, managing of sessions, content, and/or other services or the like, may be performed by a plurality of computing devices, without departing from the scope or spirit of the present invention.

Illustrative Mobile Client Environment

Figure 2:
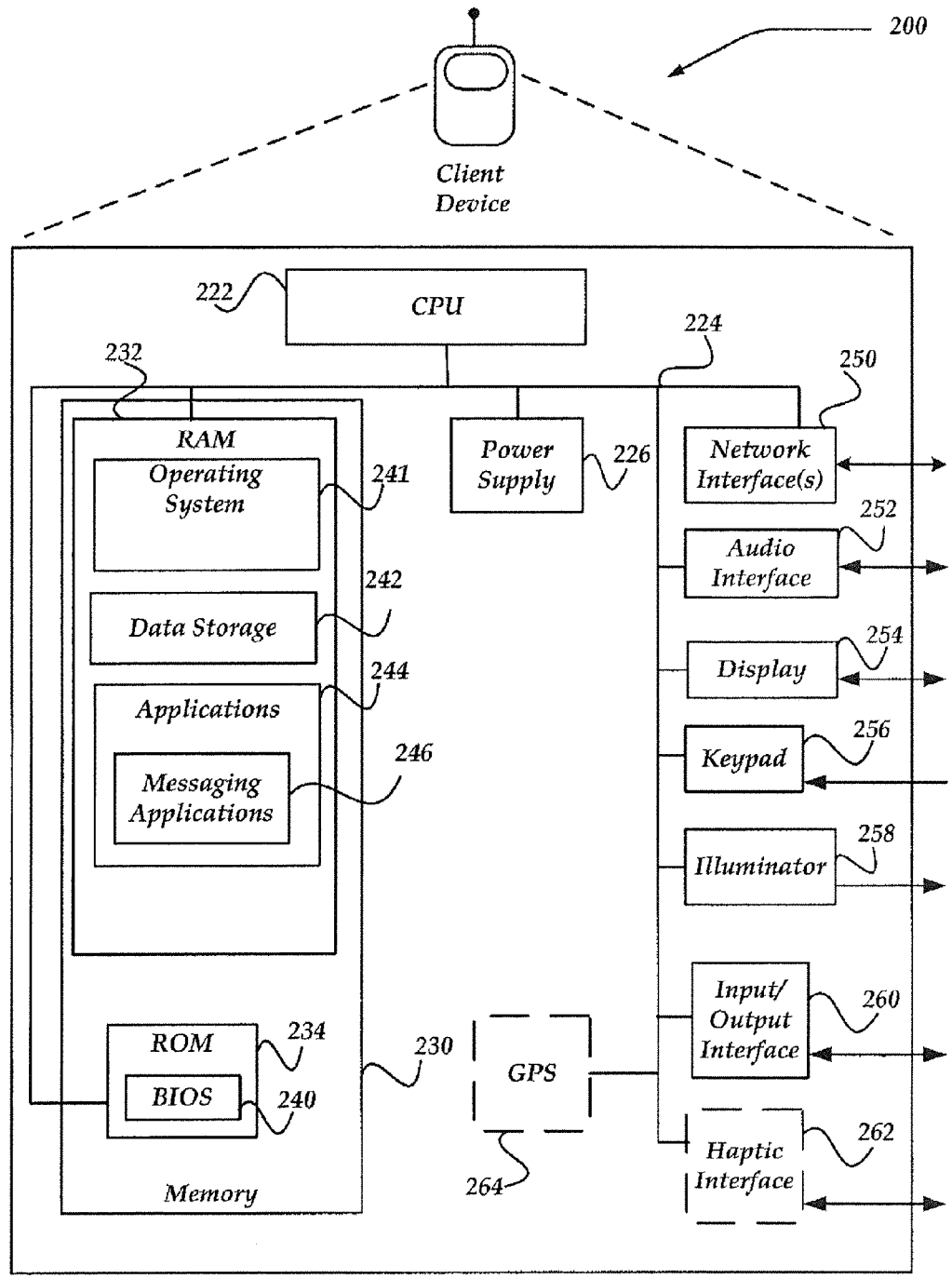
FIG. 2 shows one embodiment of a mobile device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, mobile devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, an optional haptic interface 262 (as indicated by the dashed box), and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, applications 244 and/or other data. For example, data storage 242 may also be employed to store information that describes various capabilities of client device 200. The information may then be provided to another device based on any of a variety of events, including being sent as part of a header during a communication, sent upon request, or the like. Moreover, data storage 242 may also be employed to store a variety of data, including but not limited to buddy lists, address books, phone number lists, photographs, text files, graphical files, or the like. At least a portion of the data may also be stored on a disk drive or other storage medium (not shown) within client device 200.

Applications 244 may include computer executable instructions which, when executed by client device 200, transmit, receive, and/or otherwise process messages, audio, video, and enable telecommunication with another user of another mobile device. Other examples of application programs include calendars, contact managers, task managers, transcoders, database programs, word processing programs, spreadsheet programs, games, and so forth. In addition, applications 244 may include any of a variety of messaging applications 246, including, but not limited to SMS, MMS, IM, email, browsers, or the like.

Figure 7:
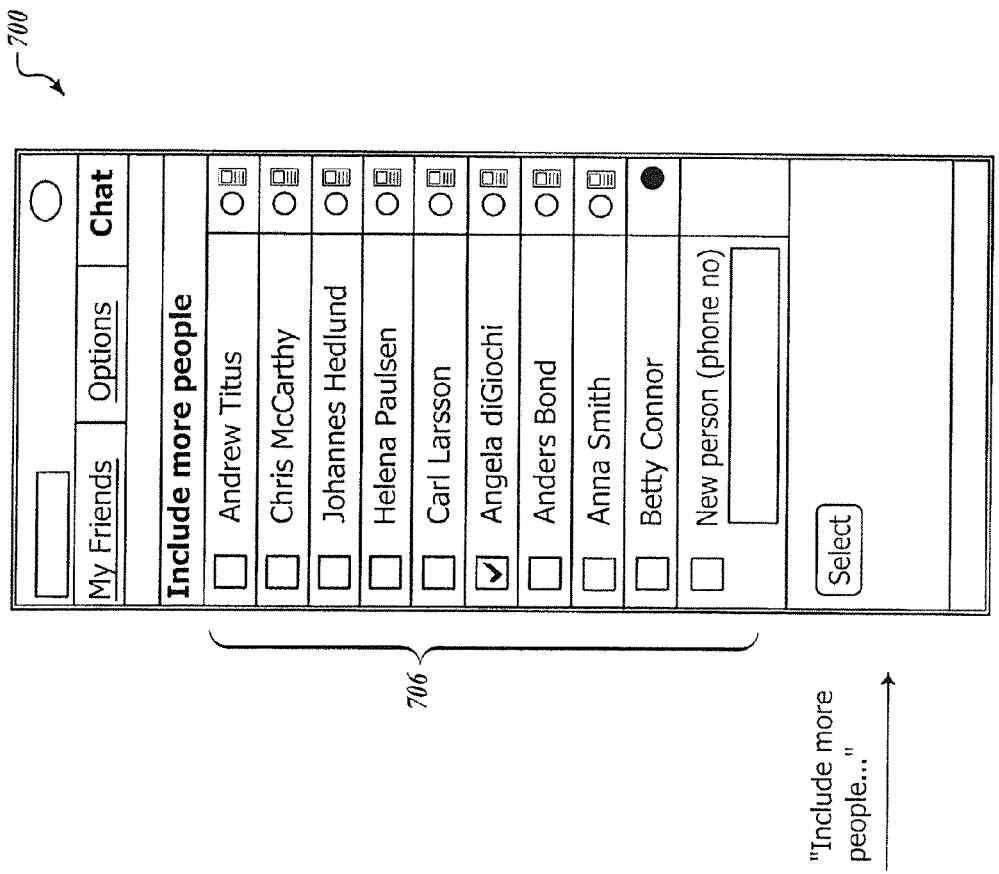
Figure 7:
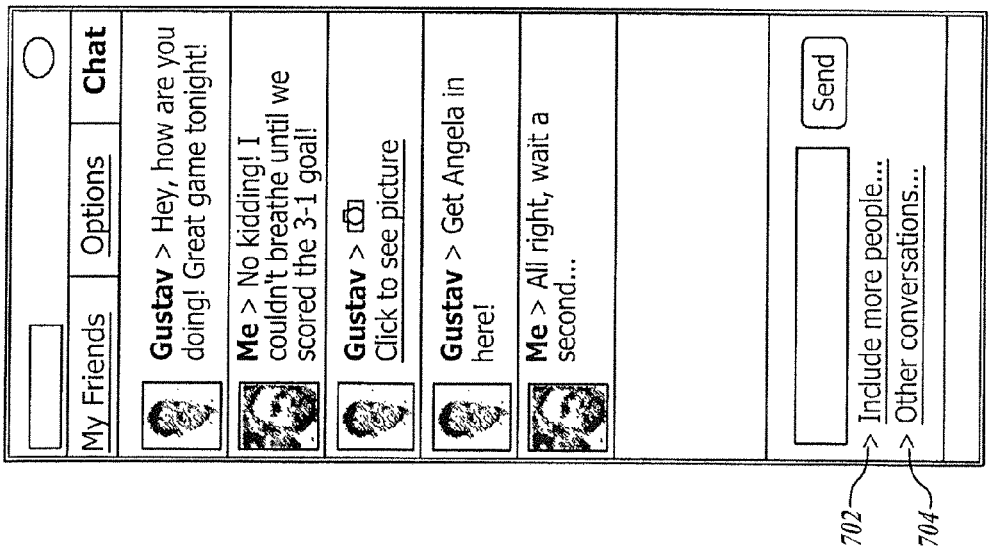

In one embodiment, messaging applications 246 may enable a user of client device 200 to dynamically and seamlessly invite other users to a session, to invite other users to access a service, or even to invite other users to access content at a remote site. Messaging applications 246 may provide the user with a pull down menu, icon, window, or the like, to initiate a conferencing session. In one embodiment, the user may also enter one or more phone numbers, user names, or the like, associated with those that the user wishes to invite to the session, service, or content. In one embodiment, messaging application 246 may display a window or other interface that includes selectable list of names, or the like, from which the user might select others to be invited. One embodiment of such an interface is illustrated in FIG. 7. However, the invention is not limited to this embodiment, and others may also be employed. In any event, the user may select one or more others to invite. The invite may then be sent using the messaging applications 246, or interface, to a remote service, such as SSS 106 of FIG. 1. In one embodiment, messaging application 246 may include in the message to the remote service information about the invited user(s), such as a phone number, account identifier, messaging address, or other identifier.

Moreover, if the user of client device 200 is not already within the requested conferencing session, messaging applications 246, in conjunction with the remote service, may automatically establish the conferencing session for the user of client device 200.

Similarly, messaging applications 246 may be configured to receive an invite message from another user, where the invite message may include a link to a conferencing session, service, to access content, or the like. The user may receive the invite message as any of a variety of message formats, including, but not limited to SMS, SMS+, XML, RSS, IRC Chat, email, IM, or the like. The recipient user (invitee) may then select the link and automatically be entered into the conferencing session, enabled to access the service, content, or the like. In one embodiment, the appropriate messaging application within messaging applications 246 may be automatically enabled on client device 200 without additional actions by the invitee user. Then messaging applications 246 may provide, in one embodiment, a history log of threaded conversations between members of the conferencing session. Moreover, the invitee may in turn be provided with an interface, icon, or the like, that enables the invitee to then invite other users.

Illustrative Server Environment

Figure 3:
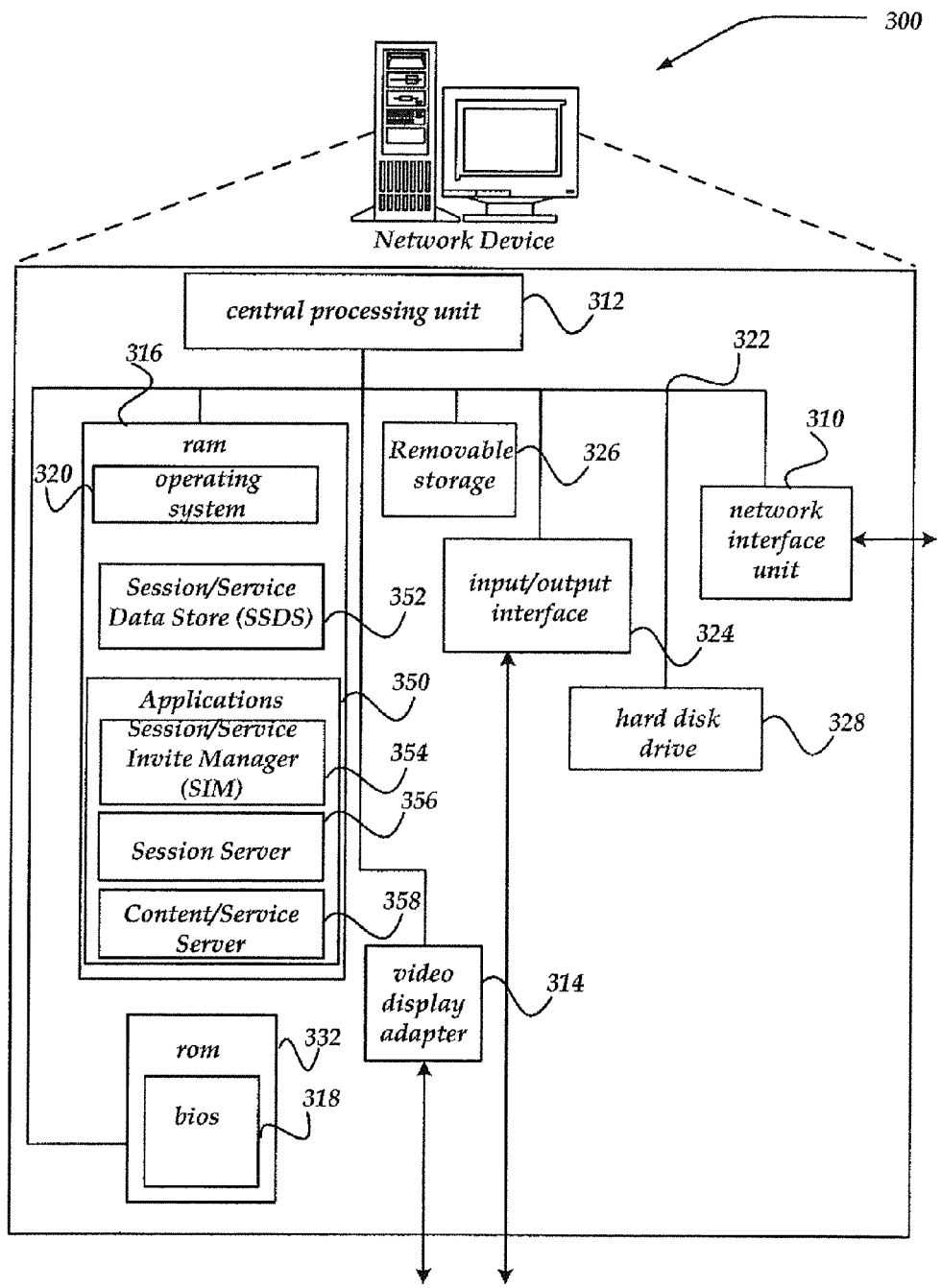
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, SSS 106 of FIG. 1.

Network device 300 includes processing unit 312, video display adapter 314, and a mass memory, all in communication with each other via bus 322. The mass memory generally includes RAM 316, ROM 332, and one or more mass storage devices, such as hard disk drive 328, and removable storage 326, including a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Session/Service data store (SSDS) 352 is useable to store data associated with a session and/or service. Such data may include, but is not limited to user identifiers, user account information, device identifiers, including phone numbers, or the like. In one embodiment, SSDS 352 may include information about a session, including members to the session, a history log, or the like. SSDS 352 may also include storage of content including movies, graphical files, audio files, text files, or the like.

SSDS 352 may be implemented using a variety of mechanisms, including, but not limited to one or more of a database, a spreadsheet, a file, folders, a script, a program, or the like. Moreover, although SSDS 352 is illustrated as residing in RAM 316, the invention is not so limited. Thus, SSDS 352 may also reside in part or in whole within other computer storage media, including, for example, hard disk drive 328, and/or removable storage 326, or even on another network device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, account management, and so forth. Session/Service Invite Manager (SIM) 354, session Server 356, and Content/Service server 358 may also be included as an application program within applications 350.

Session server 356 represents virtually any server process that is configured to manage network communications. Thus, session server 356 represents any of a variety of messaging services, including, but not limited to email server applications, IM server applications, SMS server applications, MMS server applications, EMS server applications, or the like. Moreover, although a single session server 356 is illustrated, the invention is not so limited, and network device 300 may include one or more messaging services and/or other services, without departing from the scope or spirit of the invention. Thus, in one embodiment, session server 356 is configured to manage messaging sessions between network devices, such as text messaging sessions, or the like.

In one embodiment, session server 356 may be configured to manage a history log of sessions between users in a session. Session server 356 may, in one embodiment, provide the history log to a user in a threaded conversation view. Session server 356 may further be configured to retain the history log after the related session is terminated. However, in one embodiment, session server 356 may select to delete the history log at session termination, inhibit access by a user to the history log after session termination, or the like.

In one embodiment, session server 356 may charge a fee for use of its messaging services. However, in one embodiment, messaging services may also provide a cost reduction, discount, or a similar benefit to a user that consents to receiving advertisements, reading advertisements, and/or clicking on advertisements.

Content/service server 358 represents at least one process that is configured and arranged to provide various services and/or content, including graphical services/content, blog services, web services/content, audio file access services, video file access services, or the like.

Session/Service Invite Manager (SIM) 354 is configured to provide and manage invitations to a session, service, and/or invitations to access content. However, SIM 354 is not constrained to merely these types of invitations, and virtually any other activity that may involve one user inviting another user may be managed by SIM 354, and therefore, the present invention.

SIM 354 may interact with content/service server 358 to provide an interface, icon, window, screen, or the like, that a user may employ to initiate a session and/or invite one or more other users to the session. Similarly, SIM 354 may also provide an interface, icon, window, screen, or the like, to enable the user to invite the other user(s) to a service, access content, or the like. In one embodiment, SIM 354 may receive an identifier for the invitee user(s), including at least one of an account identifier, a device identifier such as a phone number, or the like, an email address, a text messaging identifier, or any other type of information that may be used to identifier the invitee(s). SIM 354 may request initiation of the requested session, and enable the inviter user to be a member to the session, if not already. SIM 354 may further generate unique identifier(s) that are each associated with a respective invitee user and session (service or content). SIM 354 may then include each unique identifier into a link, such as a WAP URL link, or the like. SIM 354 may further provide the link (with the unique identifier) to the respective invitee in an invite message. In one embodiment, the invite message may include a message from the inviter user. In another embodiment, SIM 354 may generate a pre-defined text message, or the like, to include within the invite message. SIM 354 may then send the one or more invite messages to the invitee user(s).

In one embodiment, SIM 354 may send the invite message to the invitee such that the invite message appears as though it is from the inviting user. That is, in one embodiment, SIM 354 may modify header information of the invite message to include a name, alias, address, or the like, of the inviting user. In one embodiment, depending upon a channel in which the invite message is sent to the invitee user, the inviting user's identifier may be different. For example, the inviting user's phone number might be used for SMS invite messages, or the inviting user's email address for email invite messages, or the inviting user's IM identifier if the invite message is sent using IM, or the like. As indicated, the invite message may be sent using any of a variety of message protocols/channels, including, but not limited to SMS, SMS+, XML, IM, RSS, Chat, email, or the like.

When the invitee user selects the link, SIM 354 receives the unique identifier and compares it to information about the sender, including information obtained when the invitee sends the response. Such information may include the invitee user's account identifier, device identifier, such as phone number, or the like. If the information received matches the unique identifier, SIM 354 may automatically (without additional invitee user actions) initiate actions to enable the invitee to be placed within the identified session, service, or the like. For example, where the session is a text messaging session, SIM 354 will communicate with session server 356 to provide information that enables messages to be sent to the invitee user's computing device that will open the messaging session on the invitee user's computing device. In one embodiment, the invitee user may also be provided with a history of any threaded conversations that may be associated with the messaging session.

It should be noted that an invitee user may receive invites to different sessions, services, content accesses, or the like. In such instances, because the unique identifiers are unique to the session/service/content and the invitee, SIM 354 is configured to manage multiple invites for a user. Thus, SIM 354 may receive multiple unique identifiers from a same invitee user, and place the invitee user into multiple sessions, services, content accesses, or the like. SIM 354 may use a process substantially similar to process 400 described below in conjunction with FIG. 4 to perform at least some of its actions. Moreover, SIM 354, in one embodiment, in conjunction with session server 356 and/or content/service server 358, may employ interfaces such as described below in conjunction with FIGS. 5-10 to perform at least some of its actions.

Generalized Operation

Figure 4:
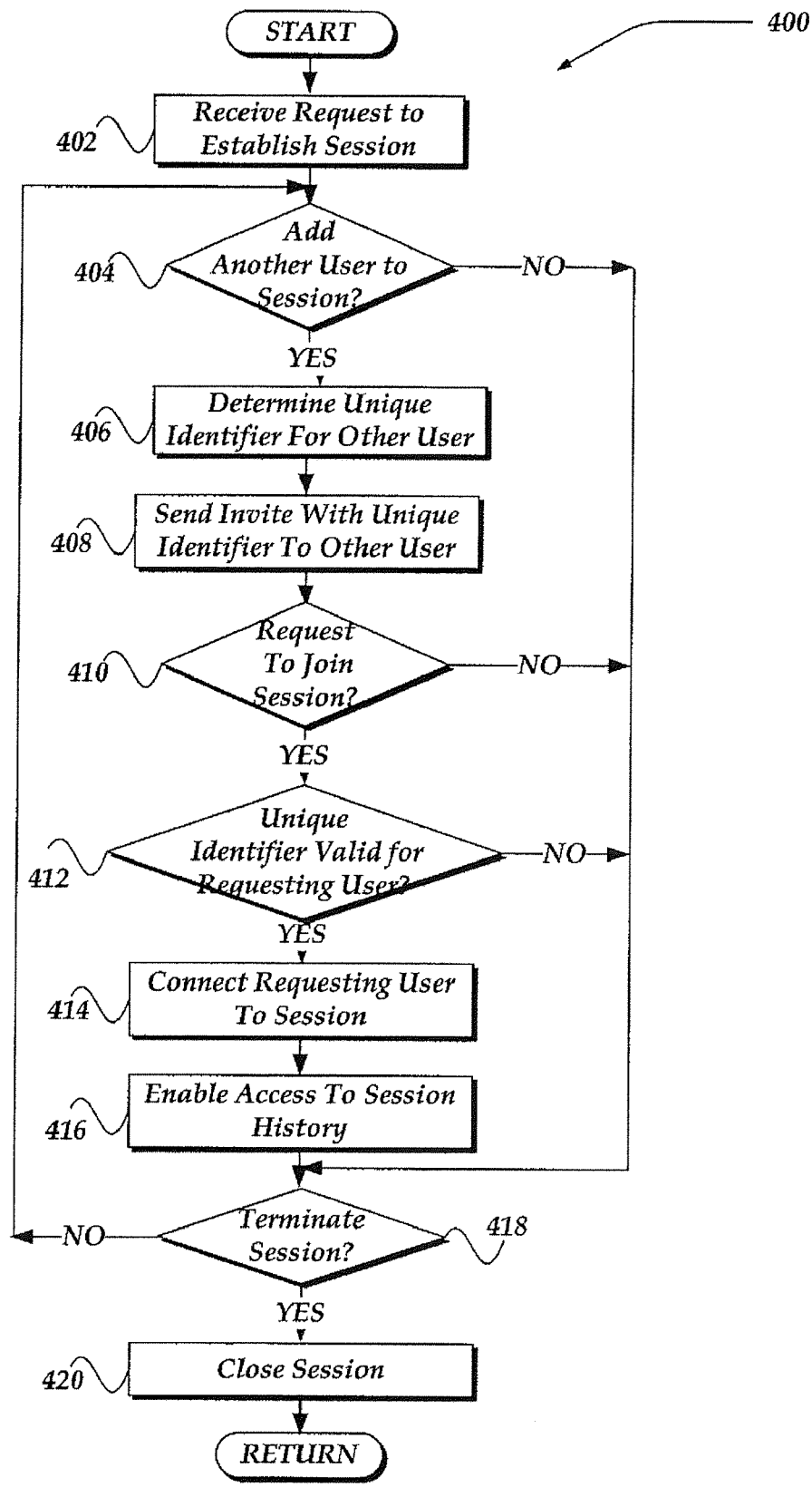
FIG. 4 illustrates a logical flow diagram generally showing one embodiment of a process for enabling a user to invite one or more users to participate in a conferencing session virtually on the fly.

The operation of certain aspects of the invention will now be described with respect to FIG. 4. FIG. 4 illustrates a logical flow diagram generally showing one embodiment of a process 400 for enabling a user to invite one or more users to participate in a conferencing session virtually on the fly. In one embodiment, process 400 of FIG. 4 may be implemented with SSS 106 of FIG. 1.

Process 400 begins, after a start block, at block 402, where a request to establish a session may be received. In one embodiment, the request may be part of a request to invite another user (an invitee user) to participate in a session. In another embodiment, the request may be from an inviter user that may want to be placed into a session. In any event, the requested session may be established and the requesting user may be placed into the session. Where the requesting user is currently in a session, the request may result, in one embodiment, establishment of another session into which the requesting user may then be placed. Thus, the request may be received from a user within a session. Moreover, the request may include an invite for another user to join the current session or that another session is to be established. In addition, in one embodiment, a unique identifier may be provided to the requester, such that the requester may leave and rejoin the session, service, or the like.

Processing then proceeds to decision block 404 where a determination is made whether a user is to be invited to the session, service, to access content, or the like. In one embodiment, the invitee user may have been identified in block 402 with the request to establish a session, or provide access to a service, content, or the like. If no invitee user is to be invited, processing branches to decision block 418; otherwise, processing proceeds to block 406.

At block 406, a unique identifier is determined for the invitee user. In one embodiment, the unique identifier is uniquely associated to the session, service, or content associated with the invite. Thus, in one embodiment, the unique identifier might be restricted to the single identified session, service, content, or the like. However, in another embodiment, the unique identifier may be configured to enable the invitee user to participate in other sessions, services, or the like, as well. In one embodiment, the unique identifier is configured to be unique to the invitee user, through use of the invitee user's phone number, device identifier, account identifier, address, or the like. Thus, in one embodiment, the unique identifier might be configured such that it may not be shared or used by another user. In one embodiment, the unique identifier may also be configured to employ information about the inviting user. In one embodiment, the unique identifier might also be configured to expire after a period of time, a number of uses, based on some event, or the like. For example, if a session for which the inviting user is invited is terminated, the unique identifier might be configured to expire upon termination of the session. However, in yet another embodiment, the unique identifier may be configured to remain valid for an extended time period to, for example, enable access to history logs of threaded conversations, obtain discounts, or the like.

In any event, processing continues next to block 408, where an invite message sent to the invitee user. In one embodiment, the unique identifier is included within the invite message using a link, script, applet, or the like. In one embodiment, the link may be a URL link that is based, in part on the unique identifier. In another embodiment, a cookie, or virtually any other mechanism by be used to associate the unique identifier with the invitee user.

The invite message may be sent to the invitee user using any of a variety of messaging channels/protocols, including those described above. Moreover, in at least one embodiment, the invite message may be sent to the invitee user using multiple channels/protocols. Thus, for example, the invite message might be sent using SMS and IM, or email, or RSS or the like. The invention is not limited to these combinational examples, however, and virtually any combination may be employed. Moreover, in one embodiment, the invitee user may identify mechanisms in which they wish to receive invites, alerts, or the like. In which instance, the invention may look to any settings, behavior patterns, or the like, associated with the invitee user, and employ one or messaging channels/protocols based on the analysis results. In still another embodiment, the inviting user may select one or more channels/protocols by which the invite message is to be sent.

Processing continues to decision block 410, where a determination is made whether the invitee user has selected to join the session, service, and/or access the content. Such action may be based on the invitee user having received the invite message, and selecting the link, script, applet, or other mechanism provided for automatically enabling the invitee user to join the session, or the like. Thus, if a message request to join is received that includes the unique identifier, processing flows to decision block 412; otherwise, processing flows to decision block 418.

At decision block 412, a determination is made whether the received unique identifier is valid. In one embodiment, also received is an identifier of the sending device, a user account, or the like. For example, in one embodiment, a mobile device identifier, phone number, MSISDN, or the like, might be received. In determining whether the received unique identifier is valid, in one embodiment, it may be compared with the received device identifier or the like, to determine if the sender is associated with the unique identifier. That is, a determination may be made to confirm that the unique identifier is not improperly be used by another user. Moreover, another determination may be made to confirm that the requested session, service, and/or content is accessible. In one embodiment, the unique identifier may be a hash of a combination of a device identifier and session identifier. Thus, in one embodiment, validation may be performed by combining the session identifier with the device identifier to determine whether the results match. In another embodiment, the unique identifier may be used as an index into a data store, to locate the session identifier and device identifier. In still another embodiment, the unique identifier may be encoded values of the session identifier and the device identifier. Then, when they are decoded, a determination may be performed to determine whether the requesting client device is associated with the session and decoded device identifier. It should be noted that the invention is not limited to these example validation determinations, and others may also be employed, without departing from the scope of the invention. In any event, if it is determined that the unique identifier is valid for the requesting user, processing flows to block 414; otherwise, processing may flow to decision block 418. In one embodiment, a notice, alert, or the like, may be provided when a unique identifier, is determined to be invalid, being improperly used, or other improper activity is detected.

At block 414, the requesting user (invitee user) is automatically connected to the session, service, or content for access. Use of the unique identifier enables the system to recognize if the invitee user is re-entering the session, perhaps having left it earlier, or whether this is a new invitee user. In any case, processing at block 414, may include providing signals, messages, or other actions that may reside in initiating and/or opening a client application or the like, at the invitee's client device that enables the invitee to be entered into the session, service, or to access the content, or the like. In one embodiment, however, the invitee user might receive additional information explaining the session, service, or the like, and how to start using it.

Because the unique identifier is unique to the invitee user and to an identified session, service, or content access, an invitee user may be invited to and/or join multiple sessions, services, or the like. Processing then moves to block 416, where, in one embodiment, the invitee user may receive or otherwise be able to access a history log of the joined session, service, or the like.

Processing continues to decision block 418, where a determination is made whether the current session, or the like, is to be terminated. Such determination may be made based on, for example, inactivity within the session for some time period (e.g., no messages between the members for the time period), receiving a message from one or more of the members indicating that the session, or the like, is to be terminated, or the like. If the session is to be terminated, processing flows to block 420; otherwise, processing loops back to block 404, where any of the members to the session, service, or the like, may invite others to join. At block 420, the session, service, or the like, is terminated. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Sharable Application Interface

FIGS. 5-10F illustrate one embodiment of a use case illustrating how virtually on-the-fly a user might provide an invite to another user to automatically participate in a session. It should be noted that the following use case is but one of a variety of possible uses of the invention, and other sessions, services, mechanisms to access content, or the like, may also be used with the invention. Thus, the use case is not intended to limit the invention in any manner, but merely illustrate one example use.

Figure 5:
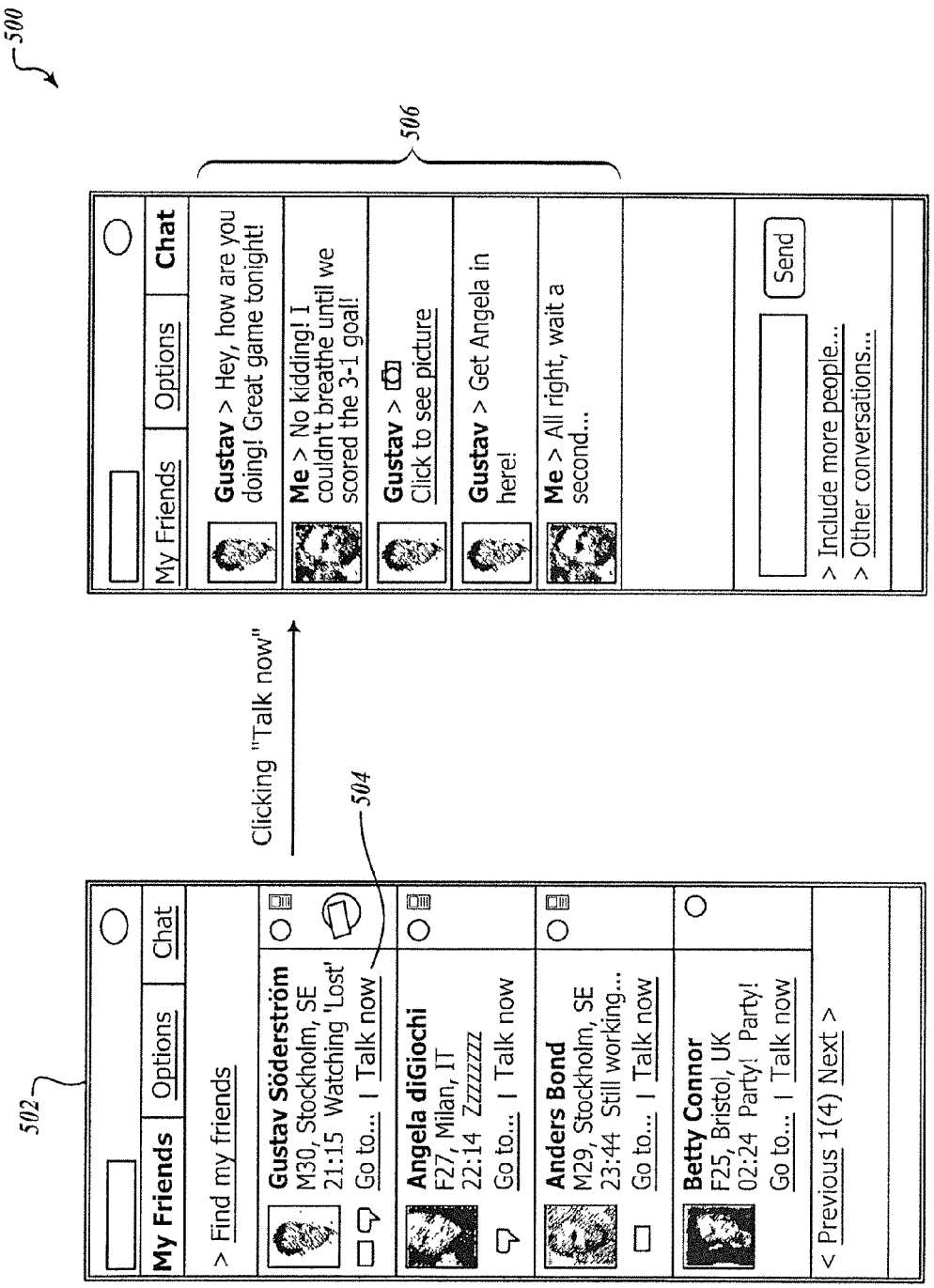
FIGS. 5-10F illustrate one embodiment of a use case illustrating how virtually on-the-fly a user might provide an invite to another user to automatically participate in a session, in accordance with the present invention.
Figure 6:
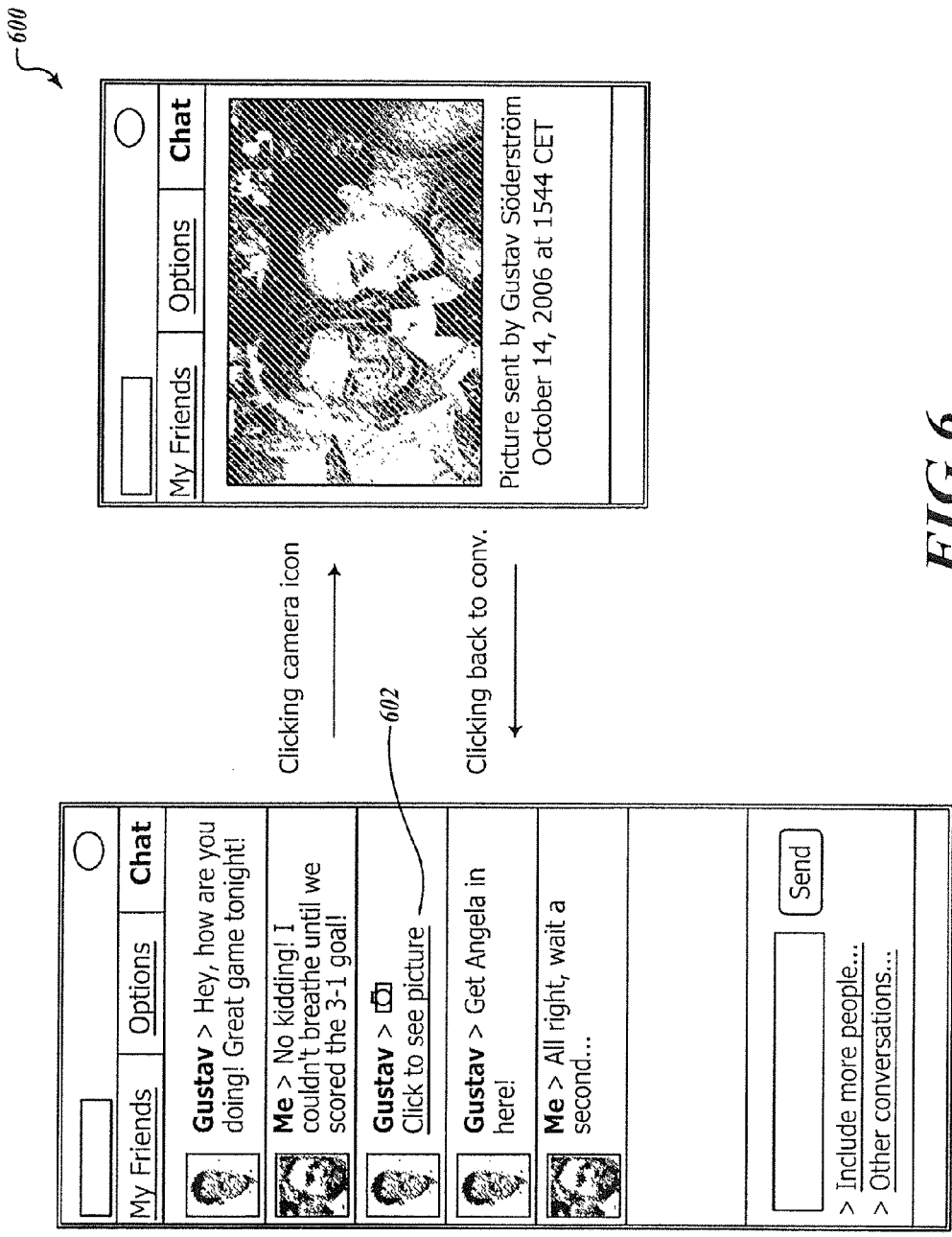

FIG. 5's process 500 illustrates one embodiment of a screen interface 502 showing possible invite messages sent to an invitee user. When the invitee user selects a message icon 504, the invitee user may be placed into a session that may include a threaded conversation 506. As shown in FIG. 6's flow 600, the members to the session may, in one embodiment, may share pictures and/or any of a variety of other content, services, or the like, through the session, using a selectable icon 602, or the like.

FIG. 7 illustrates flow 700 that, in one embodiment, enables the members of the session, service, or the like, to also invite others to the conversation using an invite icon 702, or the like. Moreover, a member may, in one embodiment, employ another icon 704 to switch from one conversation, session, service, or the like, to another one. As shown, when the member selects to invite other users to a session, they may be presented with, an interface, such as interface 706 that may be used to invite others. It should be noted that interface 706 is but one of a variety of possible interfaces that may be used to enable a member to invite users to a session, service, or the like. Thus, interface 706 is not intended to be restrictive, or to narrow the scope of the invention in any manner.

Figure 8:
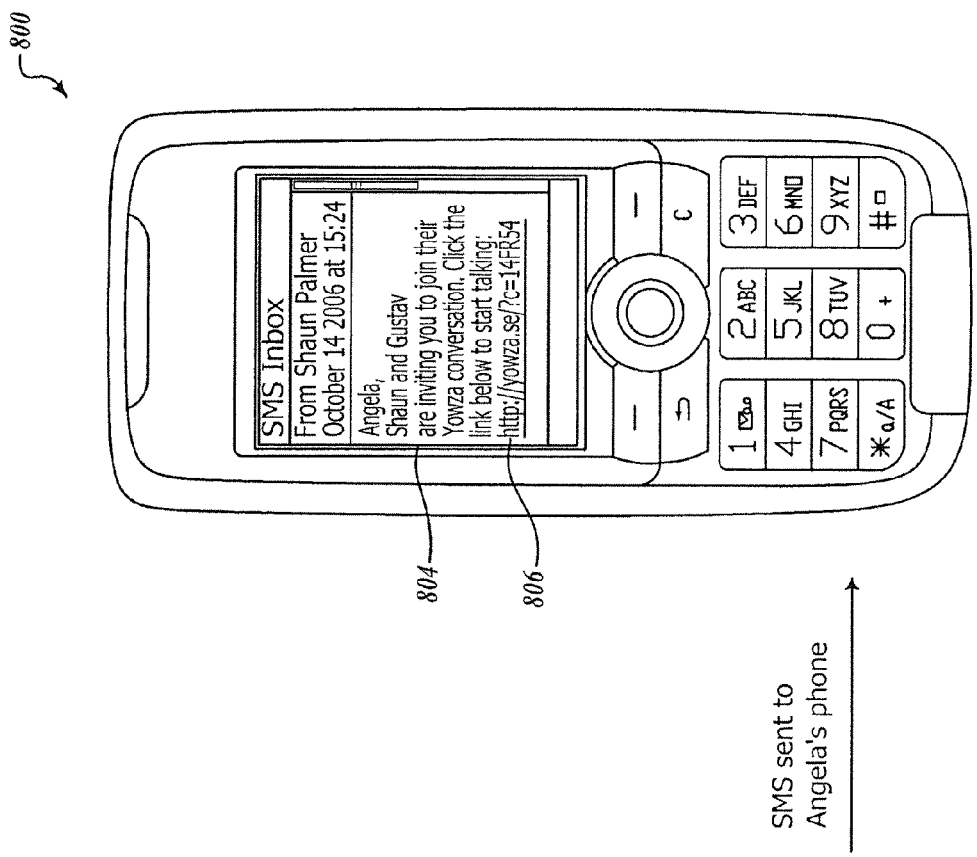
Figure 8:
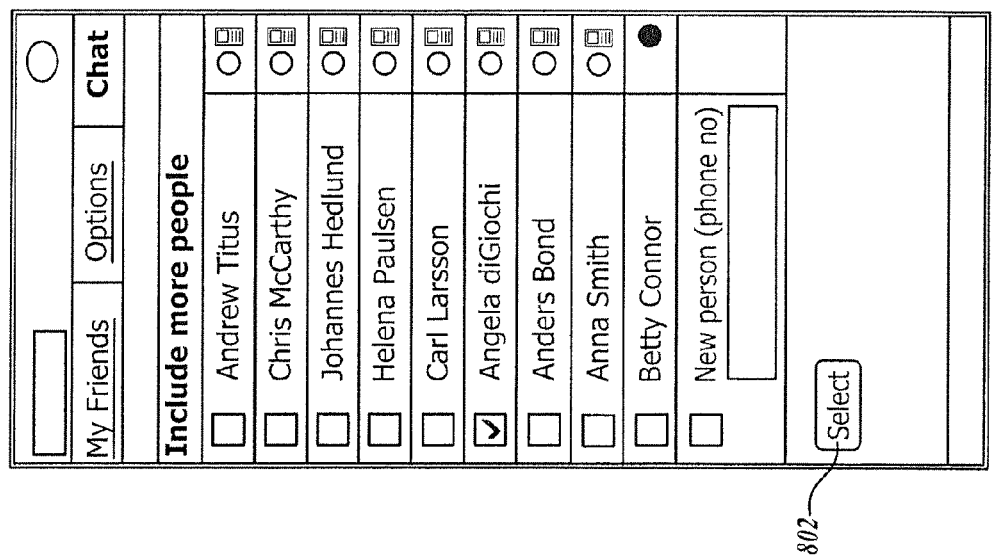
Figure 9:
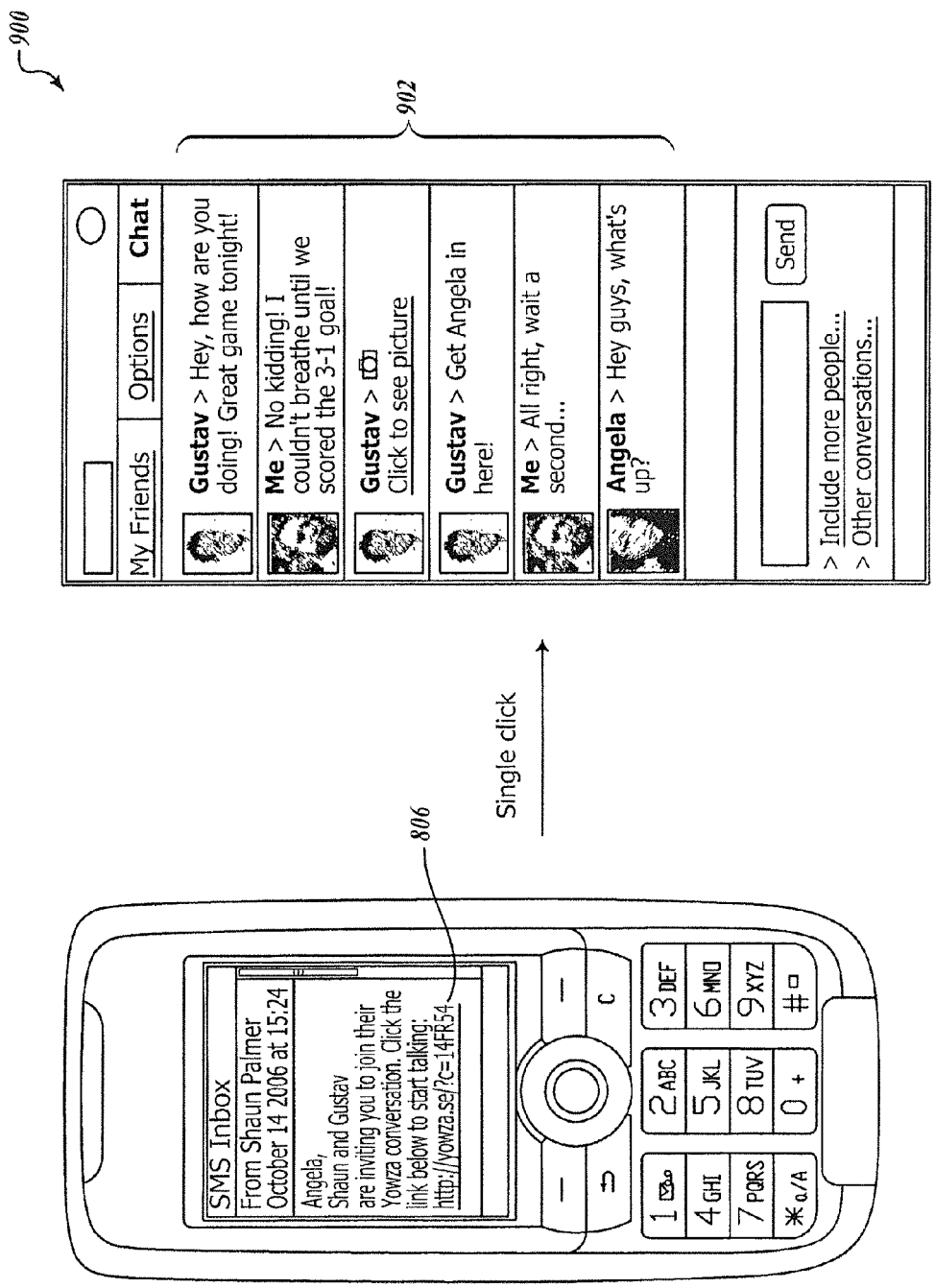
Figure 10A:
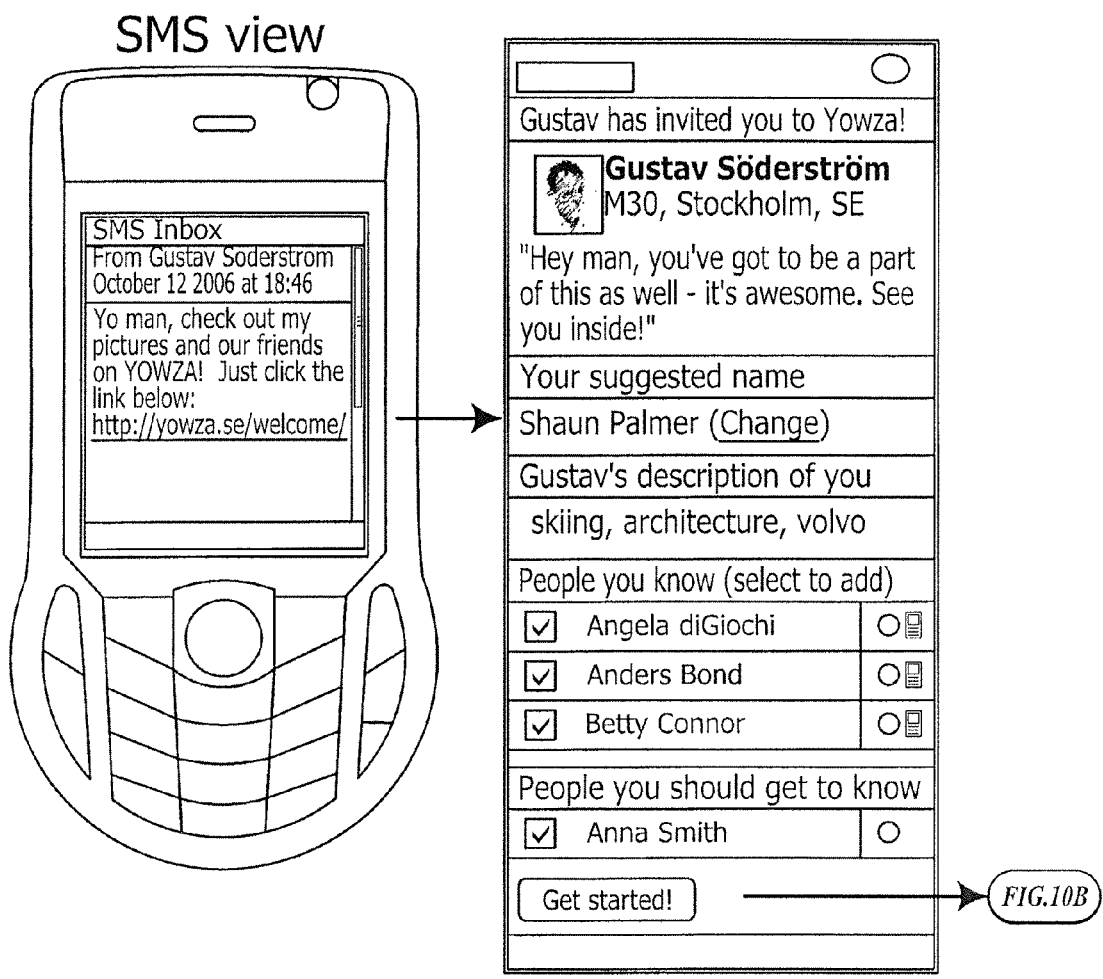
Figure 10B:
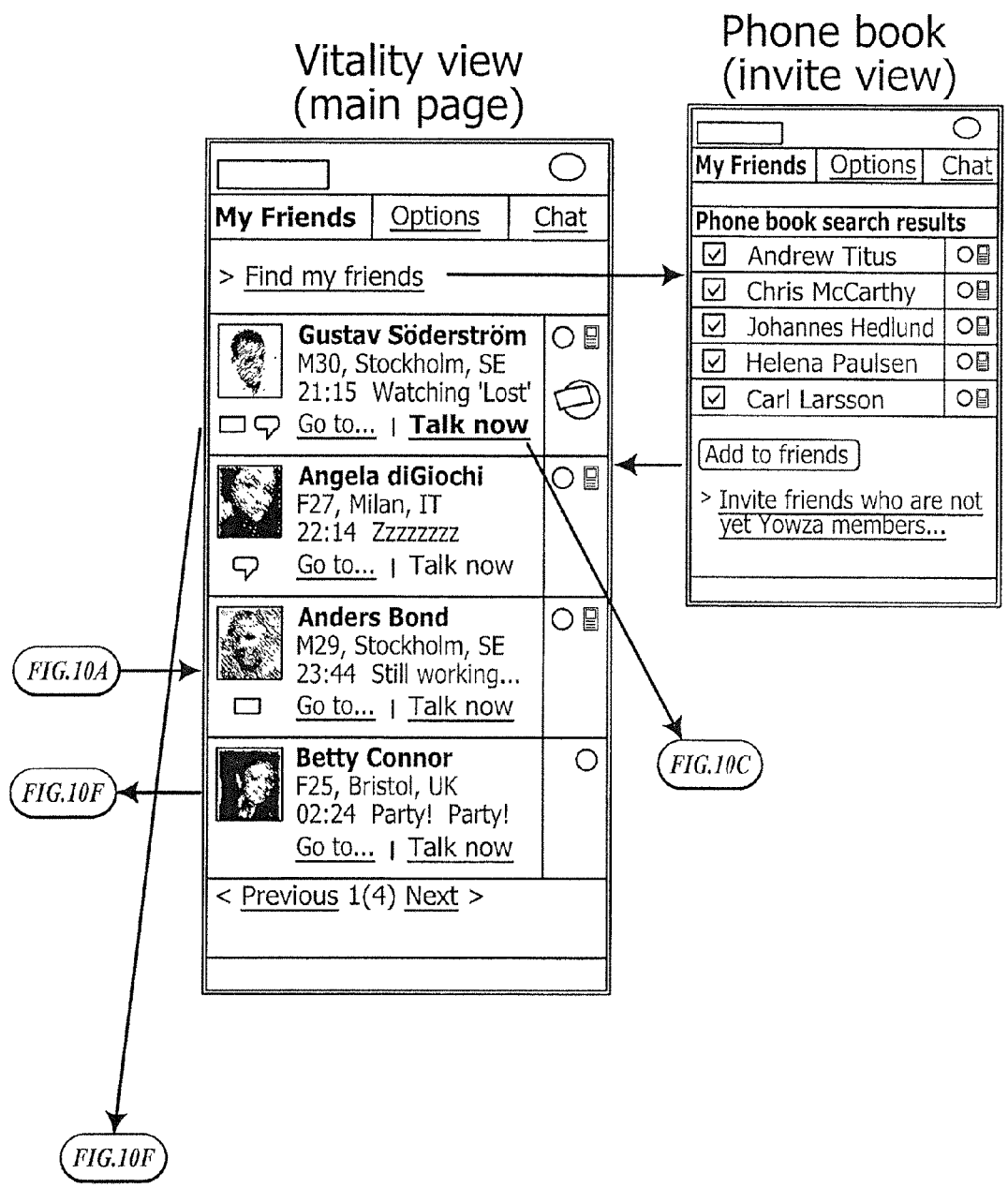
Figure 10C:
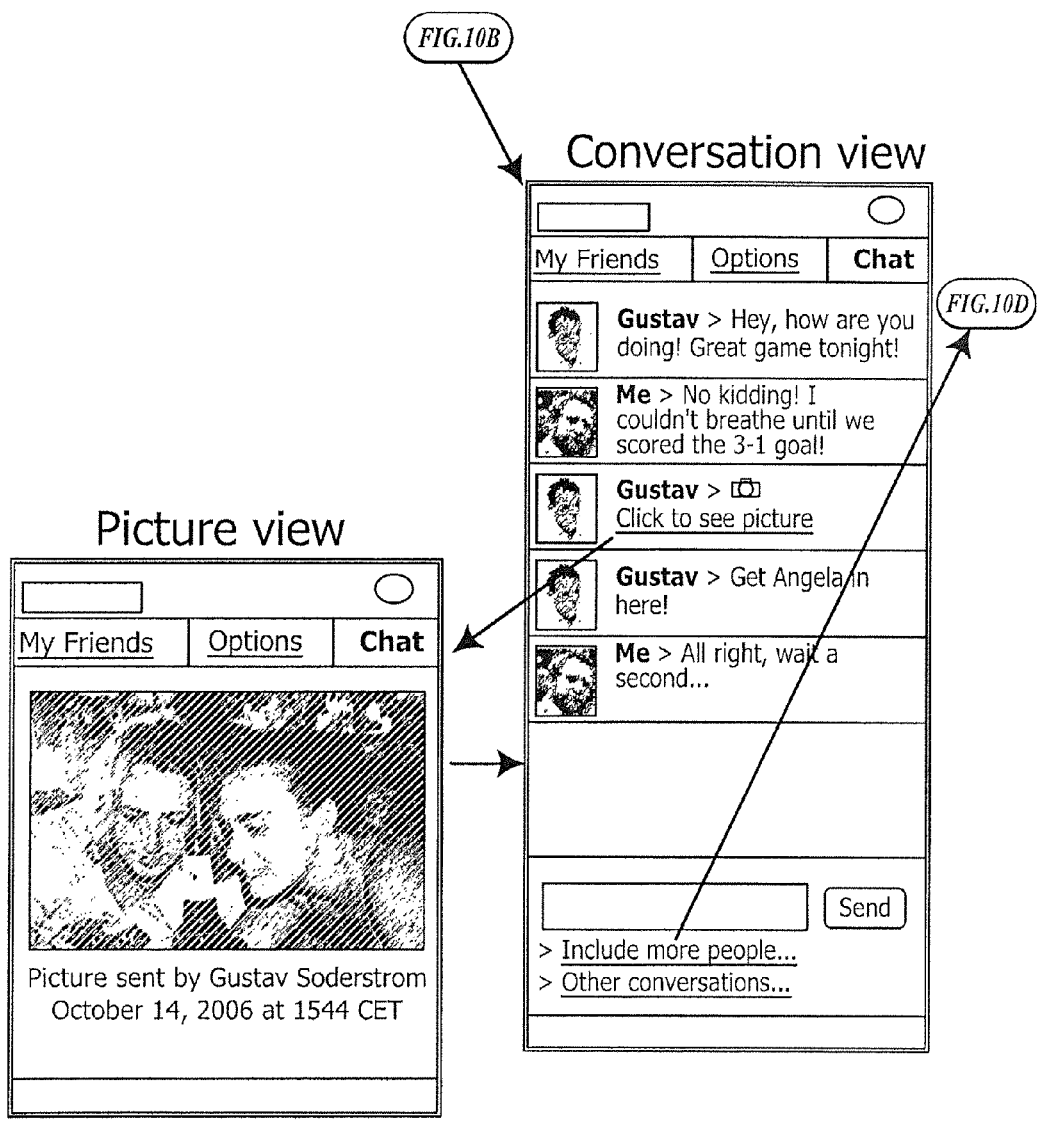
Figure 10D:
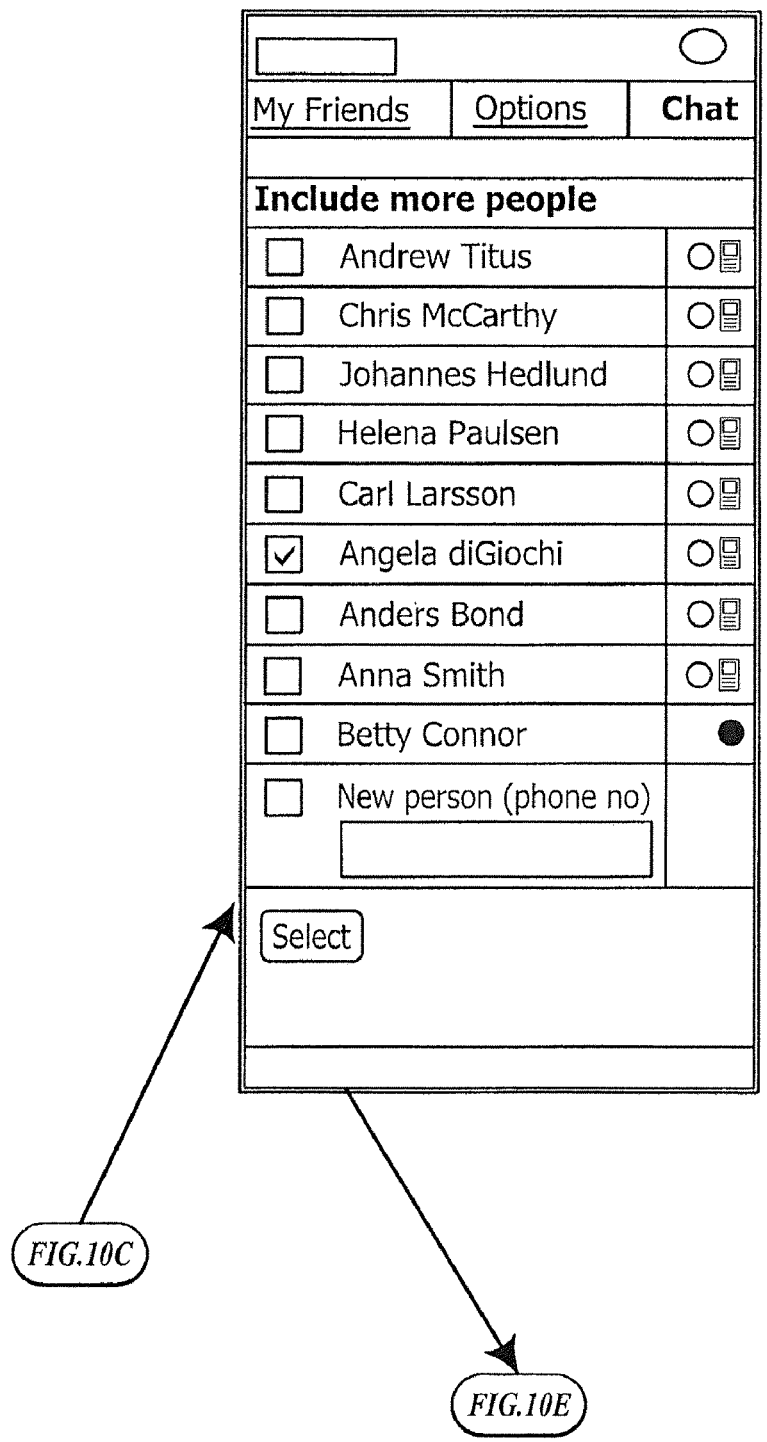
Figure 10E:
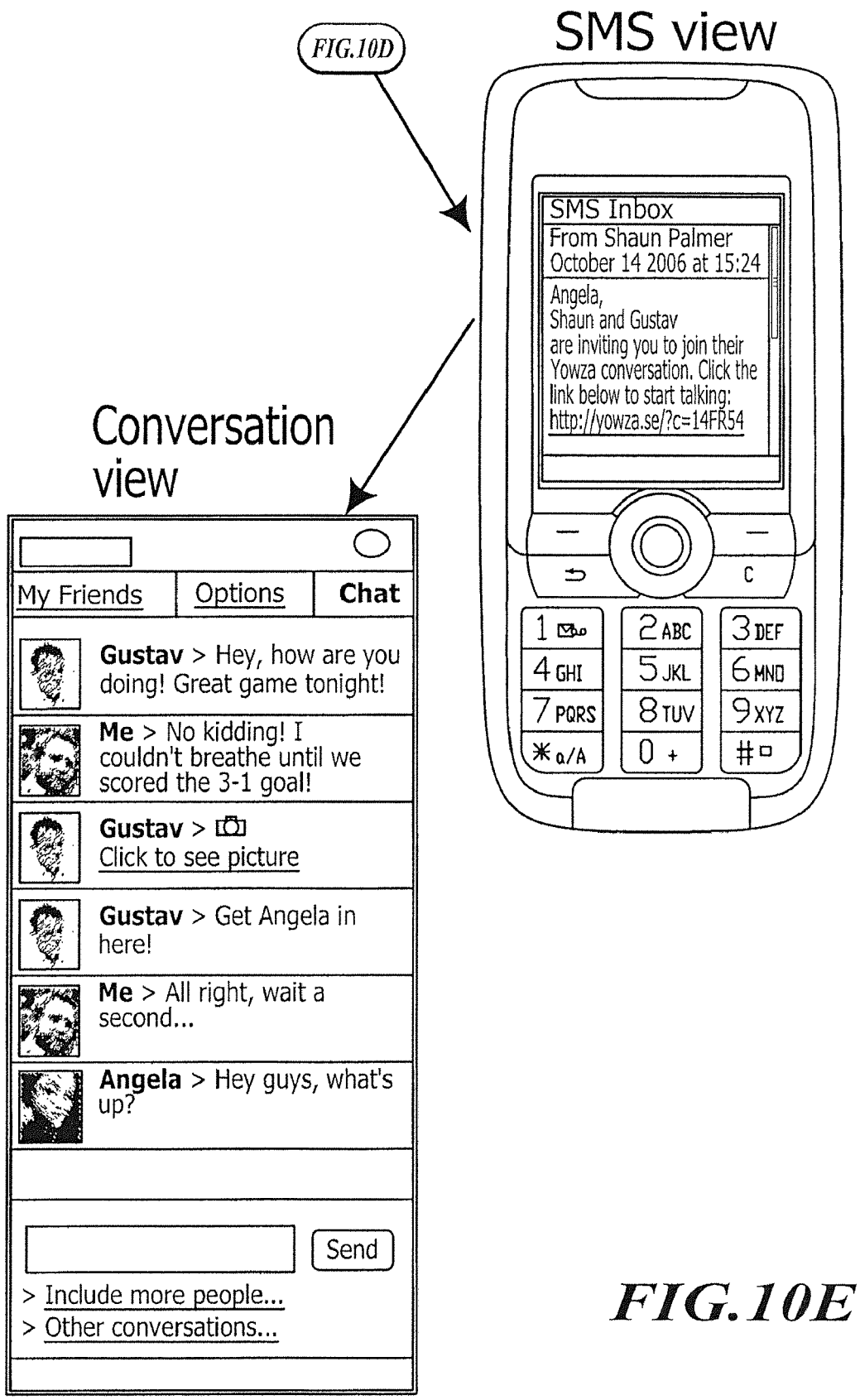
Figure 10F:
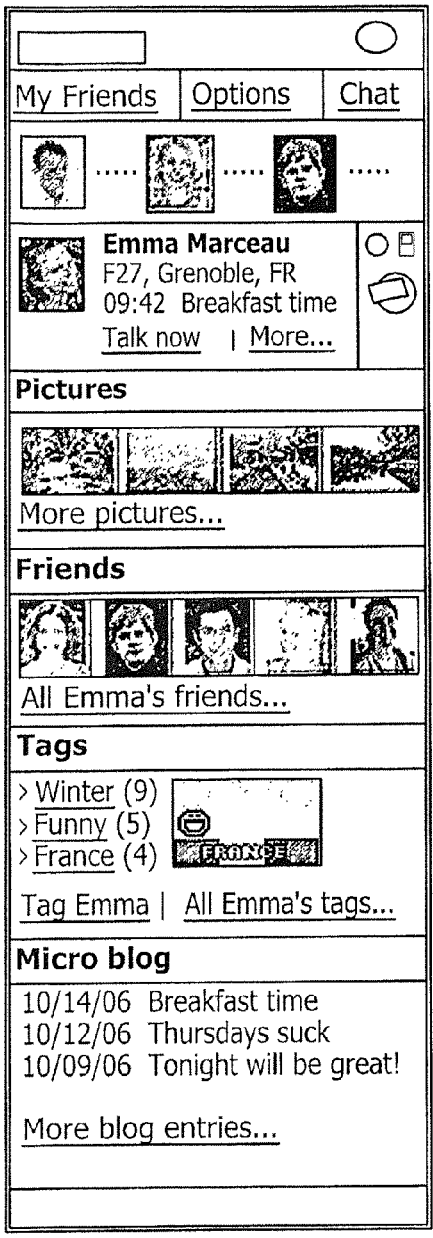
Figure 10F:
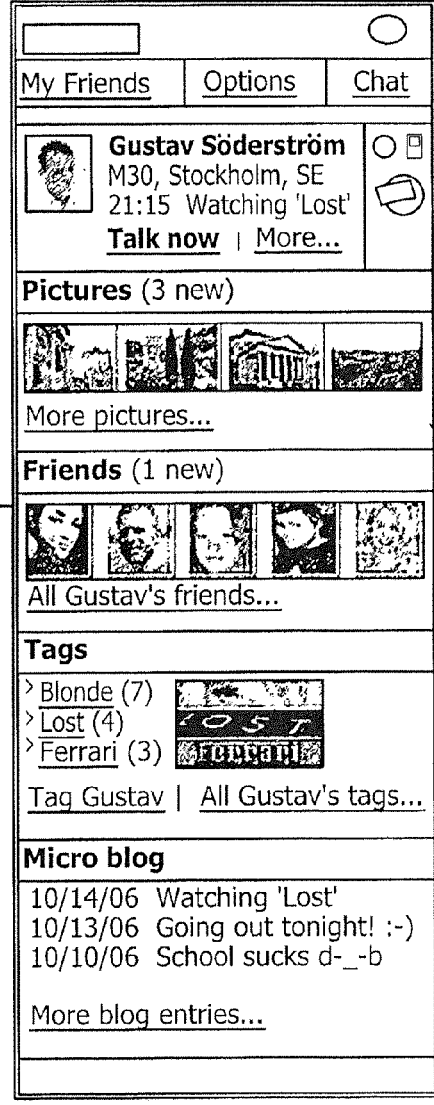

FIG. 8 illustrates in flow 800 that, in one embodiment, the member user may employ a selection icon 802 to enable an invite message to be sent to the selected one or more invitee user(s). As shown, in one embodiment, the invite message may appear to have been sent by the member user, as seen in the from address 808. In one embodiment, the invitee user may receive the invite message as an SMS message. However, the invention is not so limited. In one embodiment, the invite message may include a brief message 804, along with a link 806, or the like. Selection of the link 806 automatically, in one embodiment, opens a session, service, or the like, for the invitee user and may display a threaded conversation interface 902 as illustrated in FIG. 9. FIGS. 10A-10F illustrate one embodiment, of a possible flow 1000 of interfaces as shown in FIGS. 5-9.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a memory for storing executable instructions; and
   a processor that is arranged to execute the instructions to perform actions, including:
      receiving, from an inviting client device, a request to generate a plurality of invitations for a plurality of other client devices to join a session;
      sending an invite message to each of the plurality of other client devices, the invite message including a unique link that is determined from an identifier that is unique to each client device in the plurality of other client devices;
as requests to join the session are received from client devices that select the unique link, along with the unique identifier and an identifier of the requesting client device:
automatically allowing a requesting client device to join the session when it is determined that the unique identifier is based on the identifier of the requesting client device, and
for each joining client device after a first joining client device, providing access to a history log of conversations between client devices participating in the session.

2. The network device of claim 1, wherein the unique identifier is a hash of a combination of a session identifier and the identifier of the requesting client device.

3. The network device of claim 1, wherein determining that the unique identifier is based on the identifier of the requesting client device further comprises combining a session identifier for the session with the identifier of the requesting client device and comparing the combination to the unique identifier.

4. The network device of claim 1, wherein the processor performs actions, further comprising:
when it is determined that the unique identifier is invalid for the requesting client device, sending at least one of an alert or a notice indicating that an improper activity is detected.

5. The network device of claim 1, wherein the link is configured such that when selected automatically enabling a valid requesting client device to access and participate in the session.

6. The network device of claim 1, wherein the identifier of the requesting device is unique to the requesting device.

7. The network device of claim 1, wherein at least one of the plurality of other client devices joins the session, later leaves the session, and subsequently rejoins the session.

8. A non-transitory computer storage device having executable instructions stored thereon, such that when executed by a computing device, performs actions, comprising:
receiving, from an inviting client device, a request to generate a plurality of invitations for a plurality of other client devices to join a session;
sending an invite message to each of the plurality of other client devices, the invite message including a unique link that is determined from n an identifier that is unique to each client device in the plurality of other client devices;
for each request to join the session that is received from a requesting client device that selects the unique link along with the unique identifier and an identifier of the requesting client device, automatically allowing the requesting client device to join the session when it is determined that the unique identifier is based on the identifier of the requesting client device, and
for at least one requesting client device that joins the session after a first joining client device, providing access to a history log of conversations between client devices participating in the session.

9. The non-transitory computer storage device of claim 8, wherein the unique identifier is a hash of a combination of a session identifier and the identifier of the requesting client device.

10. The non-transitory computer storage device of claim 8, wherein determining that the unique identifier is based on the identifier of the requesting client device further comprises combining a session identifier for the session with the identifier of the requesting client device and comparing the combination to the unique identifier.

11. The non-transitory computer storage device of claim 8, wherein the instructions perform actions, further comprising:
when it is determined that the unique identifier is invalid for the requesting client device, sending at least one of an alert or a notice indicating that an improper activity is detected.

12. The non-transitory computer storage device of claim 8, wherein the link is configured such that when selected automatically enabling a valid requesting client device to access and participate in the session.

13. The non-transitory computer storage device of claim 8, wherein the identifier of the requesting device is unique to the requesting device.

14. The non-transitory computer storage device of claim 8, wherein the invite message is sent to each of the plurality of other client devices using a messaging protocol.

15. The non-transitory computer storage device of claim 8, wherein the link is configured using a wireless application protocol.

16. A system, comprising:
a plurality of computing devices, each computing device having memory and a central processing unit, and wherein at least a first computing device is configured to manage messages, and wherein one or more of the other computing devices in the plurality are configured to perform actions, comprising:
receiving, from an inviting client device, a request to generate a plurality of invitations for a plurality of other client devices to join a session;
employing the first computing device to send an invite message to each of the plurality of other client devices, the invite message including a unique link based on that is determined from an identifier that is unique to each client device in the plurality of other client devices;
for each received request to join the session that is received from a requesting client device that selects the unique link along with the unique identifier and an identifier of the requesting client device, automatically allowing the requesting client device to join the session when it is determined that the unique identifier is based on the identifier of the requesting client device, and
for at least one requesting client device that joins the session after a first joining client device, providing access to a history log of conversations between client devices participating in the session.

17. The system of claim 16, wherein the unique identifier is a hash of a combination of a session identifier and the identifier of the requesting client device.

18. The system of claim 16, wherein determining that the unique identifier is based on the identifier of the requesting client device further comprises combining a session identifier for the session with the identifier of the requesting client device and comparing the combination to the unique identifier.

19. The system of claim 16, wherein the instructions perform actions, further comprising:
when it is determined that the unique identifier is invalid for the requesting client device, sending at least one of an alert or a notice indicating that an improper activity is detected.

20. The system of claim 16, wherein the history log comprises threaded conversations between client devices active in the session.

* * * * *